(12) United States Patent
Campbell et al.

(10) Patent No.: US 7,995,719 B2
(45) Date of Patent: Aug. 9, 2011

(54) COORDINATION OF A VOICEMAIL RESPONSE WITH CALENDAR SCHEDULING

(75) Inventors: Keith M. Campbell, Cary, NC (US); Caroline M. Metry, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1372 days.

(21) Appl. No.: 11/470,354

(22) Filed: Sep. 6, 2006

(65) Prior Publication Data
US 2008/0069317 A1    Mar. 20, 2008

(51) Int. Cl.
*H04M 1/64*    (2006.01)
*H04M 7/00*    (2006.01)

(52) U.S. Cl. ................... 379/88.17; 379/221.01

(58) Field of Classification Search ............. 379/221.01, 379/88.17, 88.18; 709/206; 455/414.1
See application file for complete search history.

(56) References Cited

U.S. PATENT DOCUMENTS

| | | | |
|---|---|---|---|
| 5,428,784 A | 6/1995 | Cahill, Jr. | |
| 6,640,230 B1 | 10/2003 | Alexander et al. | |
| 6,731,323 B2 | 5/2004 | Doss et al. | |
| 6,735,292 B1 | 5/2004 | Johnson | |
| 6,810,114 B2 | 10/2004 | Welfley | |
| 6,836,537 B1 | 12/2004 | Zirngibl et al. | |
| 7,873,355 B2 * | 1/2011 | Graefen | 455/414.1 |
| 2002/0090069 A1 | 7/2002 | Yaker | |
| 2003/0018816 A1 | 1/2003 | Godfrey et al. | |
| 2003/0190019 A1 | 10/2003 | Chefalas et al. | |
| 2004/0028208 A1 * | 2/2004 | Carnazza et al. | 379/221.01 |
| 2004/0133638 A1 | 7/2004 | Doss et al. | |
| 2005/0021636 A1 * | 1/2005 | Kumar | 709/206 |

FOREIGN PATENT DOCUMENTS

JP    2002111853    * 10/2000 ............... 379/88.17

* cited by examiner

*Primary Examiner* — Fan Tsang
*Assistant Examiner* — Mohammad Islam
(74) *Attorney, Agent, or Firm* — Cynthia Seal; Hoffman Warnick LLC

(57) ABSTRACT

The present invention is directed to the coordination of a voicemail response (e.g., away message) with calendar scheduling. A method in accordance with an embodiment of the present invention includes: receiving a phone call; forwarding the phone call to a voicemail system; determining a phone number associated with the phone call; determining a calendar entry for a current time; and generating a voicemail response based on the phone number and the calendar entry.

2 Claims, 1 Drawing Sheet

COORDINATION OF A VOICEMAIL RESPONSE WITH CALENDAR SCHEDULING

BACKGROUND OF THE INVENTION

1. Field of the Invention

The present invention generally relates to voicemail. More specifically, the present invention is directed to the coordination of a voicemail response with calendar scheduling.

2. Related Art

When someone calls a person's phone and that person does not answer, usually a single, generic response (e.g., away message) will be played informing the caller that the person they are trying to reach is unavailable. In certain cases, however, the intended recipient of the call may like to provide certain callers with a more detailed response (e.g., informing the caller where they are and at what time they will be available), while leaving unknown or casual callers a more generic response. However, current voicemail systems are not capable of providing this type of functionality.

SUMMARY OF THE INVENTION

The present invention is directed to the coordination of a voicemail response with calendar scheduling.

The present invention provides a "smart" voicemail system, which is linked to a calendar program on a user's cellular telephone, and which can be updated from an external source, such as Lotus Notes. The voicemail allows for different levels of authorization based on a caller's phone number. Different responses will be read back from the calendar program to the caller based on an authorization level and a configuration of an associated calendar entry. In this way, selected callers (e.g., spouse, family members, boss, etc.) can be provided with more detailed information (e.g., exact whereabouts, next available free time, etc.), while other callers can be provided with a more generic response.

A first aspect of the present invention is directed to a method for coordinating a voicemail response with calendar scheduling, comprising: receiving a phone call; forwarding the phone call to a voicemail system; determining a phone number associated with the phone call; determining a calendar entry for a current time; and generating a voicemail response based on the phone number and the calendar entry.

A second aspect of the present invention is directed to a system for coordinating a voicemail response with calendar scheduling, comprising: a system for receiving a phone call; a system for forwarding the phone call to a voicemail system; a system for determining a phone number associated with the phone call; a system for determining a calendar entry for a current time; and a system for generating a voicemail response based on the phone number and the calendar entry.

The illustrative aspects of the present invention are designed to solve the problems herein described and other problems not discussed.

BRIEF DESCRIPTION OF THE DRAWINGS

These and other features of this invention will be more readily understood from the following detailed description of the various aspects of the invention taken in conjunction with the accompanying drawings.

Figure 1:
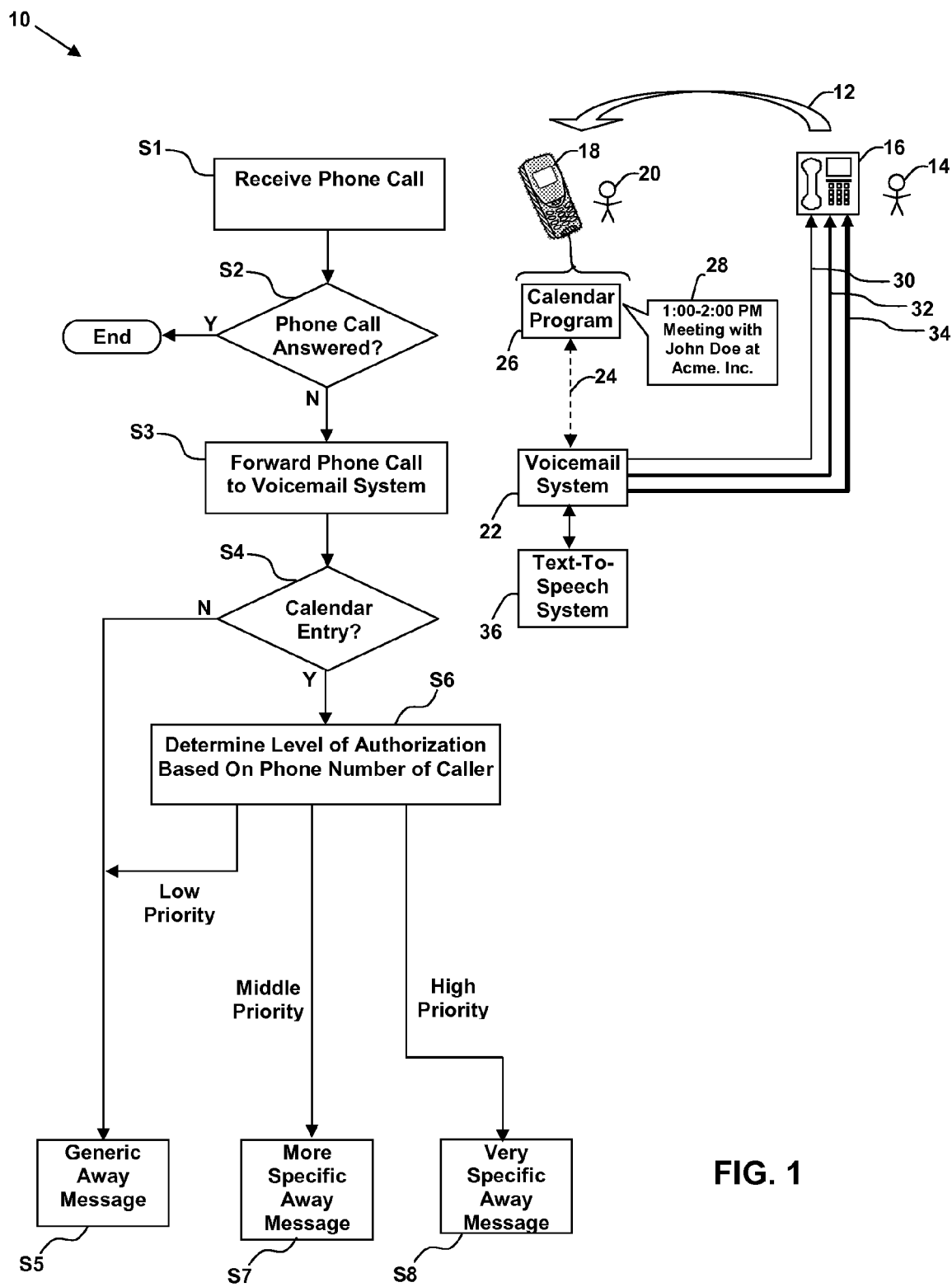
FIG. 1 depicts a system for the coordination of a voicemail response with calendar scheduling in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As detailed above, the present invention provides a "smart" voicemail system, which is linked to a calendar program on a user's cellular telephone, and which can be updated from an external source, such as Lotus Notes. The voicemail allows for different levels of authorization based on a caller's phone number. Different responses will be read back from the calendar program to the caller based on an authorization level and a configuration of an associated calendar entry. In this way, selected callers (e.g., spouse, family members, boss, etc.) can be provided with more detailed information (e.g., exact whereabouts, next available free time, etc.), while other callers can be provided with a generic response.

FIG. 1 depicts a flow diagram 10 of an illustrative process for the coordination of a voicemail response with calendar scheduling in accordance with an embodiment of the present invention.

In step S1, a phone call 12 initiated by a caller 14 via a device 16 (e.g., telephone, cell phone, voice over IP (VoIP), etc.) is received by a cell phone 18. If the phone call 12 is answered (step S2) by the user 20, the process ends. If the phone call 12 is not answered by the user 20, the phone call 12 is forwarded to a voicemail system 22 in step S3.

The voicemail system 22 is linked 24 to a calendar program 26 on the cell phone 18. The data used by the calendar program 26 can be provided by the user 20 of the cell phone 18, provided via an external source, such as Lotus Notes, or provided in any other suitable manner. In step S4, the cell phone 18 determines from the calendar program 26 whether there is a calendar entry 28 for the current time (e.g., the time at which the phone call 12 was forwarded to the voicemail system 22). If a calendar entry 28 for the current time does not exist, flow passes to step S5, where a generic voicemail response 30 is generated by the voicemail system 22 and provided to the caller 14 via the device 16. If a calendar entry 28 exists for the current time, flow passes to step S6.

In step S6, the level of authorization of the caller 14 to obtain information regarding the user 20 is determined based on the phone number of the device 16 used by the caller 14 to place the phone call 12. The phone number of the caller 12 can be determined using caller-ID, which is generally available on most cell phones, or in any other suitable manner. The authorization level of a given caller can be set in the cell phone 18 by the user 20 when entering/editing an entry in a "Contact" list or via an external contact manager. For instance, an authorization level of "3," "Low," or "L" can be used to indicate a low priority level, an authorization level of "2," "Medium," or "M" can be used to indicate a middle priority level, while an authorization level of "1," "High," or "H" can be used to indicate a high priority level. Any number/types of authorization levels can be used in the practice of the present invention.

If the authorization level of the caller 14 is determined to be "Low" (e.g., indicating a low priority level), flow passes to step S5, where a generic voicemail response (e.g., generic voicemail response 30) is generated by the voicemail system 22 and provided to the caller 14 via the device 16. If the authorization level of the caller 14 is determined to be "Medium" (e.g., indicating a middle priority level), flow passes to step S7, where a more specific voicemail response 32 is generated by the voicemail system 22 and provided to the caller 14 via the device 16. In this case, the voicemail response 32 can provide additional information to the caller 14, such as the next available free time of the user 20, but not the exact whereabouts of the user 20. Information regarding the next available free time of the user 20 can be extracted from the calendar program 26 as part of step S4 or in a separate step, and can be verbalized, for example, using a text-to-speech system 36, for incorporation into the voicemail response 32. Using the illustrative calendar entry 28 as an example, the voicemail response 32 can provide information such as "I am not available right now, but will be available to receive calls after 2:00 PM."

If the authorization level of the caller 14 is determined to be "High" (e.g., indicating a high priority level), flow passes to step S8, where an even more specific voicemail response 34 is generated by the voicemail system 22 and provided to the caller 14 via the device 16. In this case, the voicemail response 34 can provide further additional information to the caller 14, such as the current location of the user 20 and the next available free time of the user 20. Information regarding the current location and next available free time of the user 20 can be extracted from the calendar program 26 as part of step S4 or in a separate step, and can be verbalized, for example, using the text-to-speech system 36, for incorporation into the voicemail response 34. Again using the illustrative calendar entry 28 as an example, the voicemail response 34 can include information such as "I am currently meeting with John Doe at Acme, Inc., and am not available right now, but will be available to receive calls after 2:00 PM." Alternatively, the voicemail response 34 can include a word-for-word reading of the calendar entry 28.

The present invention allows for different levels of authorization based on a caller's phone number. Although three levels of authorization are described above, it will be apparent that any number and type of authorization levels can be used in the practice of the present invention. Further, the illustrative voicemail responses described above are not meant to be limiting in any way. To this extent, any type of voicemail response can be generated for each different authorization level. In addition, different voicemail responses can be generated for different callers who have the same authorization level.

The present invention or portions thereof can be implemented on any now known or later developed computer system that is capable of executing computer program code. The computer program code can be provided on a computer-readable medium or provided in any other suitable manner.

The foregoing description of the embodiments of this invention has been presented for purposes of illustration and description. It is not intended to be exhaustive or to limit the invention to the precise form disclosed, and many modifications and variations are possible.

What is claimed is:

1. A method for coordinating a voicemail response with calendar scheduling, comprising:
   receiving a phone call from a caller;
   forwarding the phone call to a voicemail system;
   determining a phone number associated with the phone call;
   determining a calendar entry for a current time in a calendar of an intended recipient of the phone call; and
   generating a voicemail response based on the phone number and the calendar entry, the generating the voicemail response comprising:
      setting an authorization level of the caller based on the phone number of the caller; and
      generating a different voicemail response for each different authorization level, the generating the different voicemail response comprising:
         generating a generic voicemail response if the calendar entry does not exist in the calendar of the intended recipient of the phone call for the current time irrespective of the authorization level of the caller;
         generating a more specific voicemail response if the caller has a first predetermined authorization level and the calendar entry exists for the current time, the more specific voicemail response providing at least a next free time of the intended recipient of the phone call as indicated in the calendar of the intended recipient of the phone call; and
         generating a very specific voicemail response through a making means if the caller has a second predetermined authorization level, higher than the first predetermined authorization level, and the calendar entry exists for the current time, the very specific voicemail response providing at least the next free time of the intended recipient of the phone call by retrieving from the calendar of the intended recipient of the phone call and a current location of the intended recipient of the phone call by retrieving from the calendar the current time in the calendar of the intended recipient of the phone call.

2. A system for coordinating a voicemail response with calendar scheduling, comprising:
   a system for receiving a phone call from a caller;
   a system for forwarding the phone call to a voicemail system;
   a system for determining a phone number associated with the phone call;
   a system for determining a calendar entry for a current time in a calendar of an intended recipient of the phone call; and
   a system for generating a voicemail response based on the phone number and the calendar entry, wherein the system for generating the voicemail response is configured to:
      set an authorization level of the caller based on the phone number of the caller; and
      generate a different voicemail response for each different authorization level, the generating the different voicemail response comprising:
         generating a generic voicemail response if the calendar entry does not exist in the calendar of the intended recipient of the phone call for the current time irrespective of the authorization level of the caller;
         generating a more specific voicemail response if the caller has a first predetermined authorization level and the calendar entry exists for the current time, the more specific voicemail response providing at least a next free time of the intended recipient of the phone call as indicated in the calendar of the intended recipient of the phone call; and
         generating a very specific voicemail response through a making means if the caller has a second predetermined authorization level, higher than the first predetermined authorization level, and the calendar entry exists for the current time, the very specific voicemail response providing at least the next free time of the intended recipient of the phone call by retrieving from the calendar of the intended recipient of the phone call and a current location of the intended recipient of the phone call by retrieving from the calendar the current time in the calendar of the intended recipient of the phone call.

* * * * *